United States Patent

Waltner

[15] 3,649,901

[45] Mar. 14, 1972

[54] HIGH VOLTAGE HOLD-DOWN CIRCUIT

[72] Inventor: Ronald Keith Waltner, Indianapolis, Ind.

[73] Assignee: RCA Corporation

[22] Filed: Mar. 5, 1971

[21] Appl. No.: 121,306

[52] U.S. Cl. ..............................321/2, 178/DIG. 11, 315/1, 315/28 R

[51] Int. Cl. ...............................................H02m 3/22, H01j

[58] Field of Search .....................................315/1, 27–29 R; 178/DIG. 11; 321/2, 2 HF

[56] References Cited

UNITED STATES PATENTS

| | | | |
|---|---|---|---|
| 2,589,299 | 3/1952 | Setchell | 315/28 X |
| 2,697,798 | 12/1954 | Schlesinger | 315/28 X |
| 3,030,444 | 4/1962 | Preisig | 315/27 R |
| 3,340,423 | 9/1967 | Doland | 315/27 R |
| 3,417,282 | 12/1968 | Hall | 315/27 R |
| 3,419,751 | 12/1968 | Hartz et al | 315/27 R |

*Primary Examiner*—William H. Beha, Jr.
*Attorney*—Eugene M. Whitacre

[57] ABSTRACT

Loss of the flyback pulse which regulates the bias applied to the control grid of the horizontal output tube of a television receiver can cause the high voltage developed for its picture tube to increase to a value at which X-radiations can be produced. Use of a dropping resistor to reduce the screen grid bias on the horizontal output tube in response to the increase in screen current which results when this negative voltage control is lost offsets this increase—and, with the further use of a clamping diode for the screen grid, maintains normal high voltage operation during non-fault conditions.

9 Claims, 1 Drawing Figure

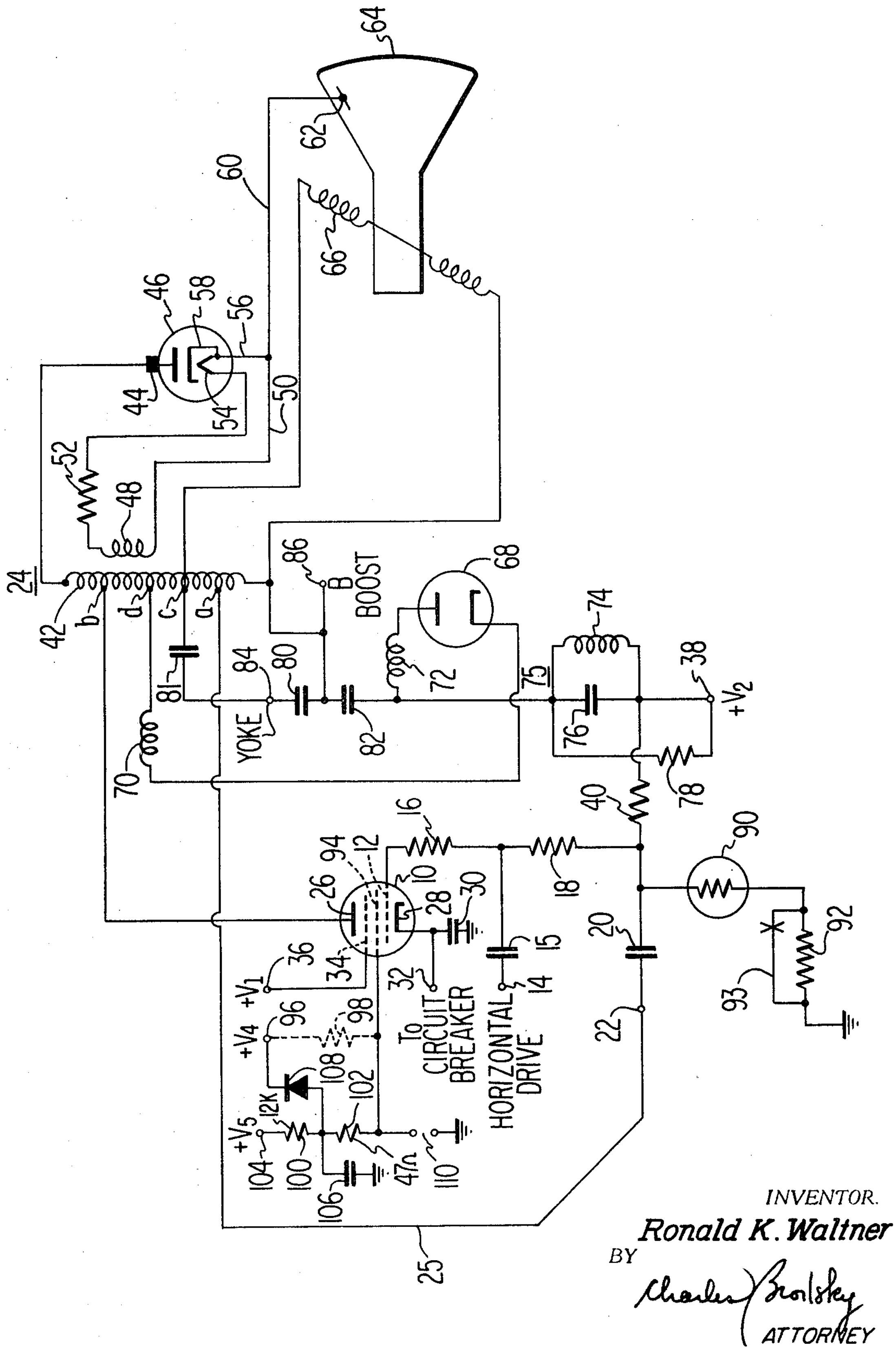
INVENTOR.
Ronald K. Waltner
BY
Charles Brodsky
ATTORNEY

HIGH VOLTAGE HOLD-DOWN CIRCUIT

BACKGROUND OF THE INVENTION

This invention relates to color television receivers, in general, and to a circuit arrangement for limiting the high voltage supplied to its picture tube to limit X-radiation, in particular.

SUMMARY OF THE INVENTION

As will become clear hereinafter, the circuit of the invention operates to limit this high voltage during the loss of the flyback pulse used to regulate the bias applied to the control grid of the horizontal output tube. Such loss represents a very serious fault condition in the receiver; even if X-radiation shields are placed around the high voltage cage and internal shielding is used to completely enclose the high voltage components within the cage, the increase in the high voltage delivered to the picture tube in the case of such fault can cause radiation exposure beyond tolerable limits. Without some means of further protection, this loss of bias control can well represent a "worst-fault" condition at which a radiation can be produced in excess of the 0.5 milli-roentgen level recently established as the acceptable limit for United States television manufacture.

However, the circuit constructed in accordance with the present invention will be seen to hold down this high voltage rise under such fault condition through the use of a resistor which serves to reduce the bias on the screen grid of the horizontal output tube whenever the loss of the regulating pulse causes the control grid bias to go more positive and increase the screen current. By further employing a diode network as a bias voltage clamp for the screen grid, the circuit of the invention enables the high voltage circuitry to operate in its normal manner during non-fault conditions, when the regulating control pulse is present.

BRIEF DESCRIPTION OF THE DRAWING

These and other advantages will be more clearly understood from a consideration of the single FIGURE of the drawing showing a partial schematic circuit diagram of a horizontal deflection and high voltage generating system for a television receiver illustrating a hold-down circuit embodying the present invention.

DETAILED DESCRIPTION OF THE DRAWING

In the drawing, the horizontal output tube is represented by the notation 10, and is supplied at its control grid 12 with a suitable deflection voltage of sawtooth waveform. Such deflection signal is more specifically applied to the grid 12 by way of a terminal 14, a capacitor 15 and a resistor 16, with the latter being serially coupled by a resistor 18 and a capacitor 20 to a second terminal 22. To terminal 22 is applied the flyback pulse which may be missing under the noted fault condition, from a primary winding tap *a* of a horizontal output transformer 24 along the connection 25. A second primary winding tap *b* of transformer 24 is coupled to the anode 26 of the horizontal output tube 10, the cathode 28 of which is coupled to ground by a capacitor 30 and to appropriate circuit breaker apparatus by a terminal 32. The suppressor grid 34 of tube 10 is coupled by a terminal 36 to a first source of positive bias potential ($+V_1$), while a second source of positive bias potential ($+V_2$) is applied to the control grid 12 by way of a terminal 38, a further resistor 40, and the previously noted resistors 16, 18.

A high voltage secondary winding 42 of the horizontal output transformer 24 is arranged for connection to the anode cap 44 of a high voltage rectifier tube 46. Heater current for the tube 46 is supplied via a winding 48 associated with the transformer 24, and coupled via a lead 50 and a resistor 52 across a heater 54 included in the tube 46. A lead 56 is coupled to the cathode 58 of the high voltage rectifier 46, and is further coupled by a high voltage lead 60 to the ultor electrode 62 of an image reproducing cathode-ray picture tube or kinescope 64. A horizontal deflection winding 66 associated with the picture tube 64 is also coupled between a primary tap *c* and the low voltage end of the transformer 24.

Also shown in the arrangement of the drawing is a damping rectifier 68 coupled by means of inductors 70 and 72 between a further tap *d* on the transformer 24 and a resonant efficiency circuit 75 including an inductor 74 coupled in parallel with a capacitor 76. A further damping resistor 78 couples the efficiency circuit 75 to the terminal 38, while a capacitor 82 couples the inductor 72 to an auxiliary voltage supply (B Boost) returned from a terminal 86 to the low voltage end of the transformer 24. Lastly, a pair of capacitors 80, 81 are coupled between the center of the horizontal deflection yoke at a terminal 84 and the capacitor 82, on the one hand, and to the winding tap *c* of transformer 24, on the other hand. Such latter capacitor connections serve to reduce ringing in the deflection yoke of the receiver whereas the inclusion of inductors 70, 72 serve to reduce high frequency radiation from the damper rectifier 68.

In the operation of the horizontal deflection and high voltage generating system thus far described, positive-going flyback pulses are developed at tap *a* of the horizontal output transformer 24 and are coupled via connection 25 to the terminal 22. A voltage dependent resistor 90 and a further resistor 92 are serially coupled between ground and the end of capacitor 20 remote from terminal 22, to rectify the applied flyback pulse and to develop a negative voltage for the control grid 12. In normal operation, this negative voltage combines with the positive voltage coupled via the terminal 38 and the resistor 40 and, also, with the negative portion of the sawtooth signal coupled through terminal 14 and capacitor 15 to set the negative operating bias applied by resistor 16 to the control grid 12 to develop the desired high voltage potential for the rectifier tube 46 and for the ultor electrode 62 of the cathode-ray kinescope 64. As will be readily appreciated, such voltage dependent resistor 90 exhibits a resistance which varies as an inverse function of the amplitude of the flyback pulse coupled through capacitor 20. A jumper wire 93 coupled to short circuit resistor 92 can, if desired, be cut to increase the developed high voltage.

However, during the "worst-case" fault condition where the flyback is lost, the resulting bias on the control grid 12 of the horizontal output tube 10 becomes more positive (i.e., less negative) and causes a substantial increase in the current flow of the tube and the developed high voltage coupled to the ultor electrode 62. With the component values set forth below, and with the screen grid 94 of the horizontal output tube 10 coupled to a third source of positive bias potential ($+V_4$) at terminal 96 of 130 volt value via a 470 ohm resistor 98 as shown in dotted lines, such fault condition results in an increase in the developed high voltage from a desired value during normal operation of some 21.9 kilovolts at zero beam current to a value approximately 32.4 kilovolts at fault. Such value is well above the acceptable limit recently established in the United States for 14"V color picture tube receiver design, where the limit has been set at 31.0 kilovolts at zero beam current.

In order to satisfy this established criteria, the arrangement of the invention incorporates—instead of the screen bias circuit using the potential source ($+V_4$) and the coupling resistor 98—a screen bias circuit including a pair of resistors 100, 102 serially coupled to the screen grid 94 from a terminal 104 at which a more positive source of bias potential ($+V_5$) is applied. In addition, a capacitor 106 couples the junction between the resistors 100, 102 to ground and a diode 108 is coupled between that junction and the terminal 96, at which the potential ($+V_4$) continues to be applied. As shown, the anode of the diode 108 is connected to the resistor junction while resistor 100 is selected more than two orders of magnitude greater than resistor 102.

With this arrangement, and in the absence of the flyback pulse at transformer tap *a*, the increase in current flow which results in the tube 10 by virtue of the less negative voltage applied in setting the control grid bias substantially increases the screen grid current. Such current flow through the larger value dropping resistor 100 serves to significantly reduce the positive voltage coupled from the source $(+V_5)$ to the screen grid 94, however, and in a direction to decrease the conductivity of the tube 10 and offset the effect of such regulating pulse absence. When such fault is not present, the normal screen grid current which flows produces a smaller voltage drop across the resistors 100, 102 such that, with a bias potential $(+V_5)$ substantially in excess of the $(+V_4)$ potential, the diode 108 becomes forward biased to clamp the junction of these resistors to the $(+V_4)$ direct voltage level. In this respect, it will be seen that the screen grid circuits during normal operating conditions for the protected version of the invention and the unprotected version shown in dotted lines are quite similar. The use of the resistor 102 serves to limit the occurrence of snivets by preventing high peak currents from developing at the screen grid 94 while the capacitor 106 serves to stabilize the direct voltage level at the screen grid 94 in the presence of screen current variations during scanning. With the same component values as listed below, the "worst-case" fault condition which previously resulted in the development of a maximum high voltage of 34.2 kilovolts resulted in the limiting of this maximum voltage to 28.5 kilovolts. Such voltage was well within the established 31.0 kilovolt limit for 14"V color kinescopes, and within the established limit for 16"V color kinescopes, as well.

To additionally protect against internal sparking between the anode 26 and screen grid 94 of the horizontal output tube 10, the circuit of the drawing includes a spark gap 110 coupled between the screen grid 94 and ground. In the absence of such device, the internal sparking could destroy the diode 108 and cause serious injury to the bias source coupled to the terminal 96.

Component values which have provided satisfactory operation in a working embodiment of the invention are set forth below, and are given by way of example only:

| | |
|---|---|
| Horizontal Output Tube **10** | 1LZ6 |
| High Voltage Rectifier **46** | A3C |
| Damper Rectifier **68** | 7CT3 |
| Color Picture Tube **64** | 4VAHP22 |
| Resistor **16** | 00 ohms |
| Resistor **18** | 30 kilohms |
| Resistor **40** | megohm |
| Resistor **52** | .7 ohms |
| | 2 watts) |
| Resistor **78** | 50 ohms |
| | 7 watts) |
| Resistor **92** | .6 kilohms |
| Resistor **100** | 2 kilohms |
| Resistor **102** | 7 ohms |
| Capacitor **15** | .047 microfarads |
| Capacitor **20** | 60 picofarads |
| | 2500 volts) |
| Capacitor **30** | .01 microfarads |
| Capacitor **76** | .1 microfarads |
| Capacitors **80,81** | 50 picofarads |
| | 2000 volts) |
| Capacitor **82** | .082 microfarads |
| Capacitor **106** | .01 microfarads |
| | 400 volts) |
| Inductor **70** | 0 microhenries |
| Inductor **72** | 0 microhenries |
| Diode **108** | 0 milliamperes, 200 volts |
| Spark gap **110** | .3 picofarads, 1000 volts |
| $(+V_1)$ | 0 volts |
| $(+V_2)$ | 80 volts |
| $(+V_4)$ | 30 volts |
| $(+V_5)$ | 80 volts |

While there has been described what is considered to be a preferred embodiment of the present invention, it will be readily apparent that other modifications may be made by those skilled in the art. Therefore, it is intended that the claims appended hereto be read in light of the spirit and scope of the teachings of this specification.

What is claimed is:

1. In a high voltage generation circuit including an output transformer and responsive to periodically recurring voltage pulses for developing a unidirectional potential to energize an image reproducing device capable of emitting X-radiation at applied energizing potentials beyond an acceptable limit, the combination comprising:
   - a high voltage output tube having first and second control electrodes;
   - first means biasing said first control electrode to a first predetermined voltage value;
   - second means biasing said second control electrode to a second predetermined voltage value at which said high voltage tube operates to develop said unidirectional potential for said image reproducing device, said second predetermined voltage value being dependent at least in part upon the presence of a flyback pulse supplied from said output transformer and in the absence of which causes said high voltage tube to develop a unidirectional potential for said image reproducing device beyond said acceptable limit; and
   - third means responsive to the absence of said flyback pulse for biasing said first control electrode to a different voltage value to reestablish the operating mode of said high voltage tube and stabilize said developed unidirectional potential below said radiation limit.

2. The combination of claim 1 wherein said first means biases the screen grid of said high voltage tube and said second means biases the control grid of said tube.

3. The combination of claim 2 wherein said first means biases the screen grid to a positive voltage, wherein said second means biases the control grid to a negative voltage in the presence of said flyback pulse and to a less negative voltage in the absence of said flyback pulse, and wherein said third means responds to the absence of said pulse to bias the screen grid to a positive voltage of magnitude less than that to which said screen grid is biased by said first means.

4. The combination of claim 3 wherein said first means includes a diode coupling a first source of bias potential to said screen grid, wherein said third means includes a resistor coupling a second source of bias potential to said screen grid, and wherein said third means responds to the current flow produced in the screen grid circuit of said high voltage tube to forward bias said diode in the presence of said flyback pulse and to reverse bias said diode in the absence of said pulse and lower the bias voltage at said screen grid in the absence of said pulse as compared to the bias voltage thereat in the presence of said flyback pulse.

5. The combination of claim 3 wherein said output transformer supplies positive-going flyback pulses during the normal operation thereof and wherein said second means rectifies said pulses to a negative value for combination with a positive source of potential and with a negative portion of said recurring voltage pulses to bias said control grid.

6. The combination of claim 4 wherein there is also included means for bypassing said screen grid to ground in the presence of internal sparking within said high voltage tube for the protection of said diode and said first source of bias potential coupled thereto.

7. The combination of claim 4 wherein said first means includes a diode having a cathode electrode coupled to a first source of positive bias potential and an anode electrode coupled to said screen grid by a first resistor, and wherein said third means includes a second resistor of substantially greater resistance value than said first resistor coupling said first resistor to a second source of positive bias potential.

8. The combination of claim 5 wherein said second means includes a time constant circuit including a first capacitor and a voltage dependent resistor which exhibits a non-linear resistance characteristic cooperative with said capacitor to rectify said flyback pulses to a negative voltage value.

9. The combination of claim 7 wherein there is further included a capacitor coupling the junction of said first and second resistors to ground.